(12) United States Patent
Purohit et al.

(10) Patent No.: US 11,609,777 B2
(45) Date of Patent: Mar. 21, 2023

(54) SYSTEM AND METHOD FOR MULTI-CLUSTER STORAGE

(71) Applicant: Nutanix, Inc., San Jose, CA (US)

(72) Inventors: Anshul Nirmalendu Purohit, Sunnyvale, CA (US); Rajesh Aavuty, Milpitas, CA (US); Biswaranjan Panda, Mountain View, CA (US); Naveen Reddy Gundlagutta, Bangalore (IN); Gowtham Alluri, San Jose, CA (US); Karan Gupta, San Jose, CA (US)

(73) Assignee: Nutanix, Inc., San Jose, CA (US)

( * ) Notice: Subject to any disclaimer, the term of this patent is extended or adjusted under 35 U.S.C. 154(b) by 214 days.

(21) Appl. No.: 16/863,673

(22) Filed: Apr. 30, 2020

(65) Prior Publication Data
US 2021/0255885 A1   Aug. 19, 2021

(30) Foreign Application Priority Data
Feb. 19, 2020   (IN) .............................. 202041007064

(51) Int. Cl.
*G06F 9/455* (2018.01)
*G06F 9/50* (2006.01)

(52) U.S. Cl.
CPC ........ *G06F 9/45558* (2013.01); *G06F 9/5077* (2013.01); *G06F 2009/45583* (2013.01); *G06F 2009/45595* (2013.01)

(58) Field of Classification Search
CPC .................................................. G06F 9/45558
USPC .......................................................... 718/1
See application file for complete search history.

(56) References Cited

U.S. PATENT DOCUMENTS

| | | |
|---|---|---|
| 5,802,309 A | 9/1998 | Cook et al. |
| 6,209,128 B1 | 3/2001 | Gerard et al. |
| 6,775,673 B2 | 8/2004 | Mahalingam et al. |
| 7,395,279 B2 | 7/2008 | Iyengar et al. |
| 7,461,912 B2 | 12/2008 | Kamiyama et al. |
| 7,653,668 B1 | 1/2010 | Shelat et al. |
| 7,685,109 B1 | 3/2010 | Ransil et al. |

(Continued)

FOREIGN PATENT DOCUMENTS

EP   4 006 737 A1   6/2022

OTHER PUBLICATIONS

"Adding objects to versioning-enabled buckets—Amazon Simple Storage Service.pdf," https://docs.aws.amazon.com/AmazonS3/latest/userguide/AddingObjectstoVersioningEnabledBuckets.html, pp. 1-2.

(Continued)

*Primary Examiner* — Mehran Kamran
(74) *Attorney, Agent, or Firm* — Foley & Lardner LLP (57) ABSTRACT

An illustrative embodiment disclosed herein is an apparatus including a processor having programmed instructions to maintain an object store including a primary cluster having one or more compute resources and one or more first storage resources, identify a secondary cluster having one or more second storage resources, select the secondary cluster to be added to the object store, allocate an available portion of the one or more second storage resources to the object store, and shard an object across the one or more second storage resources and the available portion of the one or more second storage resources.

27 Claims, 3 Drawing Sheets

(56) References Cited

U.S. PATENT DOCUMENTS

| | | |
|---|---|---|
| 7,721,044 B1* | 5/2010 | Chatterjee ............. G06F 3/0607 |
| | | 714/E11.088 |
| 8,019,732 B2 | 9/2011 | Paterson-Jones et al. |
| 8,166,128 B1 | 4/2012 | Faulkner et al. |
| 8,250,033 B1 | 8/2012 | Desouter et al. |
| 8,312,027 B2 | 11/2012 | Lamb et al. |
| 8,352,424 B2 | 1/2013 | Zunger et al. |
| 8,549,518 B1 | 10/2013 | Aron et al. |
| 8,554,724 B2 | 10/2013 | Zunger |
| 8,601,473 B1 | 12/2013 | Aron et al. |
| 8,683,112 B2 | 3/2014 | Drobychev et al. |
| 8,799,222 B2 | 8/2014 | Marathe et al. |
| 8,849,759 B2 | 9/2014 | Bestler et al. |
| 8,850,130 B1 | 9/2014 | Aron et al. |
| 8,863,124 B1 | 10/2014 | Aron |
| 8,930,693 B2 | 1/2015 | Holt et al. |
| 8,997,088 B2 | 3/2015 | Gurikar et al. |
| 9,003,335 B2 | 4/2015 | Lee et al. |
| 9,009,106 B1 | 4/2015 | Aron et al. |
| 9,043,372 B2 | 5/2015 | Makkar et al. |
| 9,043,567 B1 | 5/2015 | Modukuri et al. |
| 9,052,942 B1* | 6/2015 | Barber ................. G06F 3/0604 |
| 9,069,708 B2 | 6/2015 | Gill et al. |
| 9,069,983 B1 | 6/2015 | Nijjar |
| 9,110,882 B2 | 8/2015 | Overell et al. |
| 9,256,498 B1 | 2/2016 | Leibowitz et al. |
| 9,336,132 B1 | 5/2016 | Aron et al. |
| 9,350,623 B2 | 5/2016 | Shadi et al. |
| 9,405,806 B2 | 8/2016 | Lysne et al. |
| 9,652,265 B1 | 5/2017 | Narayanasamy et al. |
| 9,705,970 B2 | 7/2017 | Pomerantz et al. |
| 9,747,287 B1 | 8/2017 | Bhardwaj et al. |
| 9,772,866 B1 | 9/2017 | Aron et al. |
| 9,805,054 B2 | 10/2017 | Davis et al. |
| 10,003,650 B2* | 6/2018 | Shetty ................... H04L 67/10 |
| 10,120,902 B2 | 11/2018 | Erdogan et al. |
| 10,176,225 B2* | 1/2019 | Naidu ................. G06F 16/2282 |
| 10,296,255 B1 | 5/2019 | Tummala |
| 10,380,078 B1 | 8/2019 | Kumar et al. |
| 10,409,837 B1* | 9/2019 | Schmidt ............. G06F 16/2379 |
| 10,528,262 B1* | 1/2020 | Shmuylovich .......... G06F 3/067 |
| 10,565,230 B2 | 2/2020 | Zheng et al. |
| 10,592,495 B1 | 3/2020 | Shami et al. |
| 10,691,464 B1 | 6/2020 | Drego et al. |
| 10,725,826 B1* | 7/2020 | Sagar .................. G06F 9/45558 |
| 10,740,302 B2 | 8/2020 | Slik et al. |
| 10,747,752 B2 | 8/2020 | Krishnaswamy et al. |
| 10,802,975 B2 | 10/2020 | Gottin et al. |
| 11,099,938 B2 | 8/2021 | Desai et al. |
| 2001/0034733 A1 | 10/2001 | Prompt et al. |
| 2002/0065776 A1 | 5/2002 | Calder et al. |
| 2002/0078065 A1 | 6/2002 | Agulhon |
| 2003/0023587 A1 | 1/2003 | Dennis et al. |
| 2004/0186826 A1 | 9/2004 | Choi et al. |
| 2006/0047636 A1 | 3/2006 | Mohania et al. |
| 2006/0080646 A1 | 4/2006 | Aman |
| 2006/0161704 A1 | 7/2006 | Nystad et al. |
| 2007/0088744 A1 | 4/2007 | Webber et al. |
| 2010/0042673 A1 | 2/2010 | Dayley |
| 2011/0082962 A1 | 4/2011 | Horovitz et al. |
| 2011/0137966 A1 | 6/2011 | Srinivasan et al. |
| 2011/0185355 A1 | 7/2011 | Chawla et al. |
| 2011/0213884 A1 | 9/2011 | Ferris et al. |
| 2012/0096052 A1 | 4/2012 | Tolia et al. |
| 2012/0096205 A1 | 4/2012 | Velayudhan et al. |
| 2012/0331065 A1 | 12/2012 | Aho et al. |
| 2012/0331243 A1 | 12/2012 | Aho et al. |
| 2013/0054523 A1 | 2/2013 | Anglin et al. |
| 2013/0198472 A1* | 8/2013 | Fang ....................... G06F 3/067 |
| | | 711/170 |
| 2013/0332608 A1 | 12/2013 | Shiga et al. |
| 2014/0279838 A1 | 9/2014 | Tsirogiannis et al. |
| 2014/0379840 A1 | 12/2014 | Dao |
| 2015/0012571 A1 | 1/2015 | Powell et al. |
| 2015/0046586 A1* | 2/2015 | Zhang ................. G06F 11/3442 |
| | | 709/224 |
| 2015/0046600 A1 | 2/2015 | Kim |
| 2015/0254325 A1* | 9/2015 | Stringham .......... G06F 16/9535 |
| | | 707/737 |
| 2015/0378767 A1 | 12/2015 | Tarasuk-Levin et al. |
| 2016/0048408 A1* | 2/2016 | Madhu ................. H04L 47/783 |
| | | 718/1 |
| 2016/0092326 A1 | 3/2016 | Wu et al. |
| 2016/0117226 A1 | 4/2016 | Hetrick et al. |
| 2016/0207673 A1 | 7/2016 | Shlonsky et al. |
| 2016/0275125 A1 | 9/2016 | Drobychev et al. |
| 2017/0075909 A1 | 3/2017 | Goodson et al. |
| 2017/0091235 A1 | 3/2017 | Yammine et al. |
| 2017/0109421 A1 | 4/2017 | Stearn et al. |
| 2017/0235764 A1* | 8/2017 | Sharpe ................ G06F 11/1484 |
| | | 707/827 |
| 2017/0235818 A1 | 8/2017 | Gorski et al. |
| 2017/0242746 A1 | 8/2017 | King et al. |
| 2017/0344575 A1 | 11/2017 | Naylor et al. |
| 2017/0351450 A1 | 12/2017 | Brandl et al. |
| 2018/0165161 A1 | 6/2018 | Slater et al. |
| 2018/0205791 A1 | 7/2018 | Frank et al. |
| 2018/0292999 A1 | 10/2018 | Nadkarni |
| 2018/0349463 A1 | 12/2018 | Bernhardy et al. |
| 2019/0004863 A1 | 1/2019 | Mainali et al. |
| 2019/0050296 A1 | 2/2019 | Luo et al. |
| 2019/0102256 A1 | 4/2019 | Murphy |
| 2019/0196885 A1 | 6/2019 | Song et al. |
| 2019/0213175 A1* | 7/2019 | Kong ...................... G06F 16/27 |
| 2019/0213179 A1 | 7/2019 | McHugh et al. |
| 2019/0227713 A1 | 7/2019 | Parthasarathy |
| 2019/0324874 A1 | 10/2019 | Gill et al. |
| 2019/0354544 A1 | 11/2019 | Hertz et al. |
| 2019/0370362 A1 | 12/2019 | Mainali et al. |
| 2019/0384678 A1 | 12/2019 | Samprathi et al. |
| 2020/0004570 A1* | 1/2020 | Glade .................... G06F 9/5077 |
| 2020/0036787 A1 | 1/2020 | Gupta et al. |
| 2020/0042364 A1 | 2/2020 | Kumar Shimoga Manjunatha et al. |
| 2020/0104222 A1* | 4/2020 | Ramamoorthi ........ H04L 41/084 |
| 2020/0117637 A1* | 4/2020 | Roy ...................... G06F 16/137 |
| 2020/0195743 A1* | 6/2020 | Jiang ................... G06F 12/0868 |
| 2020/0201724 A1* | 6/2020 | Saito ................... G06F 11/2089 |
| 2020/0250044 A1* | 8/2020 | Sharma ................ G06F 16/278 |
| 2020/0310859 A1 | 10/2020 | Gupta et al. |
| 2020/0310980 A1 | 10/2020 | Gupta et al. |
| 2020/0311116 A1 | 10/2020 | Anvaripour et al. |
| 2020/0314174 A1 | 10/2020 | Dailianas et al. |
| 2020/0319909 A1* | 10/2020 | Jawahar .................. G06F 9/455 |
| 2020/0387510 A1 | 12/2020 | Ransil et al. |
| 2020/0394078 A1* | 12/2020 | Taneja .................. G06F 9/4806 |
| 2021/0026661 A1* | 1/2021 | Sulcer ................. H04L 41/0806 |
| 2021/0034350 A1* | 2/2021 | Chen ...................... G06N 5/02 |
| 2021/0072917 A1* | 3/2021 | Surla ................... G06F 11/3034 |
| 2021/0124651 A1* | 4/2021 | Srinivasan ............ G06F 9/5077 |
| 2021/0181962 A1* | 6/2021 | Dai ....................... G06F 3/0644 |
| 2021/0294499 A1 | 9/2021 | Wang et al. |

OTHER PUBLICATIONS

"Method:disks.get|Compute Engine Documentation|Google Cloud. pdf," https://cloud.google.com/compute/docs/reference/rest/v1/disks/get, pp. 1-17.

"NetApp ONTAP 9.7 Announced—StorageReview.com," (Jun. 14, 2019), https://www.peakresources.com/netapp-ontap-9-6-release-notes-and-thoughts/, pp. 1-5.

"PUT Object|Cloud Storage|Google Cloud," https://cloud.google.com/storage/docs/XML-api/put-object, pp. 1-3.

"Retrieving object versions from a versioning-enabled bucket—Amazon Simple Storage Service.pdf," https://docs.aws.amazon.com/AmazonS3/latest/userguide/RetrievingObjectVersions.html, pp. 1-3.

"XML and More: OCI?Knowing Object Storage Basics" (Jan. 13, 2019), http://xmlandmore.blogspot.com/2019/01/ociknowing-object-storage-basics.html, pp. 1-6.

Amazon Simple Storage Service User Guide API Version Mar. 1, 2006 (Year: 2006).

(56) References Cited

OTHER PUBLICATIONS

Ballard, Brit, "Back to Basics: Writing SQL Queries," (Apr. 21, 2014), https://thoughtbot.com/blog/back-to-basics-sql, 1-17 pages.

Dellemc, "Elastic Cloud Storage (ECS)," (Aug. 2017), https://repository.usc.edu/sites/repository.usc.edu/files/ecs_overview.pdf. pp. 1-57.

Dubinsky Leon, "Behind the scenes of Cloud Spanner's ExecuteQuery request|Google Cloud Blog," (Jan. 7, 2021), https://cloud.google.com/blog/topics/developers-practitioners/behind-the-scenes-of-cloud-spanners-executequery-request, pp. 1-7.

F5, "Enable Single Namespace for VMware Horizon with View Deployments," https://www.f5.com/pdf/solution-center/vmware-single-namespace-overview.pdf, pp. 1-2.

FireEye, "Building Scalable and Responsive Big Data Interfaces with AWS Lambda | AWS Big Data Blog," (Jul. 10, 2015), https://aws.amazon.com/blogs/big-data/building-scalable-and-responsive-big-data-interfaces-with-aws-lambda/, pp. 1-10.

Guess A.R., "Cloudian HyperStore 7 Multi-Cloud Data Management Unifies Public Cloud and On-Premises Storage—DATAVERSITY," (Jan. 29, 2018), https://www.dataversity.net/cloudian-hyperstore-7-multi-cloud-data-management-unifies-public-cloud-premises-storage/, pp. 1-4.

"How to use Indexing to Improve Database Queries," https://dataschool.com/sql-optimization/how-indexing-works/, pp. 1-12.

NetApp, "A Unified Platform for Cloud Storage Infrastructure," (Oct. 26, 2020), https://cloud.netapp.com/blog/cvo-blg-one-unified-platform-for-cloud-storage-infrastructure-and-data-services, pp. 1-8.

NetApp, "StorageGRID Solves Your Unstructured Data Management Problems|NetApp Blog," (Apr. 17, 2019), https://www.netapp.com/blog/storagegrid-solves-your-unstructured-data-management-problems/, pp. 1-6.

Oracle Multimedia User's Guide, 12c Release 1 (12.1), E17697-09 Jul. 2014 (Year 2014).

Oracle SQL Developer User's Guide, Release 1.5, E12152-08, Jul. 2014 (Year: 2014); pp. 1-128.

Patel Kiran, Goynes Eddie, "Lower latency with AWS Elemental Mediastore chunked object transfer|AWS Media Blog," (Jul. 2, 2019), https://aws.amazon.com/blogs/media/lower-latency-with-aws-elemental-mediastore-chunked-object-transfer/, pp. 1-6.

Rupprecht Lukas, Zhangz Rui, Owen Bill, Pietzuch Peter, Hildebrandz Dean, "SwiftAnalytics: Optimizing Object Storage for Big Data Analytics," https://lsds.doc.ic.ac.uk/sites/default/files/swift-analytics_ic2e17_crv.pdf, pp. 1-7.

Sonobuoy, "Sonobuoy," https://sonobuoy.io/, 1-6 pages.

VM ware, "VMware Cloud Director Object Storage Extension Documentation.pdf," https://docs.vmware.com/en/VMware-Cloud-Director-Object-Storage-Extension/index.html, pp. 1-3.

VMware, "Introducing HCX Enterprise—Cloud Blog—VMware," (Aug. 8, 2019), https://blogs.vmware.com/cloud/2019/08/08/introducing-hcx-enterprise/, pp. 1-6.

VMware, "VMware HCX Enterprise: Non-vSphere to vSphere Workload Migration—Cloud Blog—VMware," (Aug. 8, 2019), https://blogs.vmware.com/cloud/2019/08/08/vmware-hcx-enterprise-non-vsphere-vsphere-workload-migration/, pp. 1-7.

VMware, "VMware Object Storage Interoperability Service-Development Guide," (Sep. 2021), https://www.vmware.com/content/dam/digitalmarketing/vmware/en/pdf/docs/vmware-object-storage-interoperability-service-development-guide.pdf, pp. 1-19.

Wikipedia, "Chunked transfer encoding," https://en.wikipedia.org/wiki/Chunked_transfer_encoding, pp. 1-4/.

Woodward Liz, "What Is Elastic Cloud Storage—A Guide to ECS in 2022," https://www.cloudwards.net/what-is-elastic-cloud-storage/, pp. 1-8.

"AWS Pricing"; Amazon Web Services; https://aws.amazon.com/pricing/; Webpage accessed on Jun. 23, 2021; pp. 1-9.

"Cloud & Hosting Services—Building a Cloud Infrastructure"; NetApp; https://www.netapp.com/hybrid-cloud/service-provider-infrastructure/; webpage accessed on Jun. 23, 2021; pp. 1-11.

"IT Service Provider Technology Solutions and Services"; HPE—Hewlett Packard; https://www.hpe.com/us/en/solutions/service-providers.html?parentPage=/us/en/solutions/service-providers; Webpage accessed on Jun. 23, 2021; pp. 1-6.

"Managed VMware Cloud Services"; VMware; https://cloud.vmware.com/providers/managed-services-provider; Webpage accessed on Jun. 23, 2021; pp. 1-5.

"Managing your storage lifecycle"; Amazon Simple Storage Service; https://docs.aws.amazon.com/AmazonS3/latest/userguide/object-lifecycle-mgmt.html; webpage accessed on Jun. 18, 2021; pp. 1-2.

"Nutanix Solution for Service Providers"; Nutanix, Inc. Solution Brief; https://aemstage.nutanix.cn/viewer?type=pdf&path=/content/dam/nutanix/resources/solution-briefs/sb-service-provider-solution-brief.pdf&icid=67VMYKPR6K6O; 2020; pp. 1-3.

"Per Virtual Machine Licensing"; VMware Per VM Pricing & Licensing Help; https://www.vmware.com/support/support-resources/licensing/per-vm.html; Webpage accessed on Jun. 23, 2021; pp. 1-7.

"Storage Tiering"; VMware Docs; https://docs.vmware.com/en/VMware-Validated-Design/5.0/com.vmware.wd.sddc-design.doc/GUID-20D2BC02-4500-462F-A353-F9B613CC07AC.html; webpage accessed on Jun. 18, 2021; pp. 1-3.

"Transitioning objects using Amazon S3 Lifecycle"; Amazon Simple Storage Service; https://docs.aws.amazon.com/AmazonS3/latest/userguide/lifecycle-transition-general-considerations.html; Webpage was accessed on Jun. 18, 2021; pp. 1-5.

"Using Amazon S3 storage classes"; Amazon Simple Storage Service; https://docs.aws.amazon.com/AmazonS3/latest/userguide/storage-class-intro.html; Webpage accessed on Jun. 16, 2021; pp. 1-6.

Gowri Balasubramanian; "Should Your DynamoDB Table Be Normalized or Denormalized?"; AWS Database Blog; https://aws.amazon.com/blogs/database/should-your-dynamodb-table-be-normalized-or-denormalized/; Dec. 5, 2016; pp. 1-5.

Luis Ayuso; "How to Report Monthly Usage with the Flex Pricing Model"; VMware Cloud Provider Blog; May 20, 2019; pp. 1-6.

Luis Ayuso; "How to Sign up for the new VCPP Flex Pricing Model"; VMware Cloud Provider Blog; May 20 2019; pp. 1-6.

Luis Ayuso; "New VCPP Pricing Model Simplifies Delivering Services"; VMware Cloud Provider Blog; May 20, 2019; pp. 1-6.

Mike Deck; "Building and Maintaining an Amazon S3 Metadata Index without Servers"; AWS Big Data Blog; https://aws.amazon.com/blogs/big-data/building-and-maintaining-an-amazon-s3-metadata-index-without-servers/; Aug. 12, 2015; pp. 1-6.

"Adding Objects to Versioning—Enabled Buckets", from https://docs.aws.amazon.com/AmazonS3/latest/dev/AddingObjectstoVersioningEnabledBuckets.html, (Oct. 2, 2019).

"Configure a Pod to Use a ConfigMap", from https://kubernetes.io/docs/tasks/configure-pod-container/configure-pod-configmap/,(Oct. 2, 2019).

"Deployments", from https://kubernetes.io/docs/concepts/workloads/controllers/deployment/,(Oct. 2, 2019).

"Retrieving Object Versions", from https://docs.aws.amazon.com/AmazonS3/latest/dev/RetrievingObjectVersions.html, (Oct. 2, 2019).

"Set up Cluster Federation with Kubefed—Kubernetes", from https://v1-14.docs.kubernetes.io/docs/tasks/federation/set-up-cluster-federation-kubefed/, (Apr. 17, 2020).

"Volumes", from https://kubernetes.io/docs/concepts/storage/volumes/, (Oct. 2, 2019).

Cano, Ignacio, et al. "Curator: Self-Managing Storage for Enterprise Clusters" (Mar. 27, 2017), from https://www.usenix.org/conference/nsdi17/.

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Oct. 15, 2013), from http://stevenpoitras.com/the-nutanix-bible/ (Publication date based on indicated capture date by Archive.org; first publication date unknown).

Poitras, Steven. "The Nutanix Bible" (Sep. 17, 2019), from https://nutanixbible.com/.

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jan. 7, 2015), from http://stevenpoitras.com/the-nutanix-bible/ (Publication date based on indicated capture date by Archive.org; first publication date unknown).

(56) References Cited

OTHER PUBLICATIONS

Poitras, Steven. "The Nutanix Bible" (Jun. 9, 2015), from http://stevenpoitras.com/the-nutanix-bible/ (Publication date based on indicated capture date by Archive.org; first publication date unknown).

The Nutanix Bible; from https://nutanixbible.com/; accessed on Jan. 12, 2016.

The Nutanix Bible; from https://nutanixbible.com/; accessed on Jun. 25, 2018.

The Nutanix Bible; from https://nutanixbible.com/; accessed on Jan. 3, 2017.

The Nutanix Bible; from https://nutanixbible.com/; accessed on Jan. 3, 2018.

The Nutanix Bible; from https://nutanixbible.com/; accessed on Sep. 4, 2015.

The Nutanix Bible; from https://nutanixbible.com/; accessed on Jan. 8, 2019.

The Nutanix Bible; from https://nutanixbible.com/; accessed on Jun. 8, 2017.

The Nutanix Bible; from https://nutanixbible.com/; accessed on Jun. 9, 2016.

"Creating an NFS file share"; AWS Storage Gateway—User Guide; https://docs.aws.amazon.com/storagegateway/latest/userguide/CreatingAnNFSFileShare.html; webpage accessed on Oct. 28, 2020; pp. 1-10.

"SwiftOnFile"; Object Storage-Gluster Docs; v: release3.7.0beta1; https://staged-gluster-docs.readthedocs.io/en/release3.7.0beta1/Administrator%20Guide/Object%20Storage/; webpage accessed on Oct. 28, 2020; pp. 1-2.

Michael Bose; "A Guide on How to Mount Amazon S3 as a Drive for Cloud File Sharing"; Nakivo Blog-Cloud-Backup to Cloud; https://www.nakivo.com/blog/mount-amazon-s3-as-a-drive-how-to-guide/; Published Jun. 17, 2020; pp. 1-27.

B+ Tree Indexes. http://web.csulb.edu/-amonge/classes/common/db/BTreeIndexes.html, Aug. 4, 2018, pp. 1-7 (2018).

Stopford. Log Structured Merge Trees. http://www.benstopford.com/2015/02/14/log-structured-merge-trees, 2015, pp. 1-8 (2015).

Wambler, Choosing a Primary Key: Natural or Surrogate? http://www.agiledata.org/essays/keys.html, 2018, pp. 1-4 (2018).

Pritchard, Stephen, "Object Storage: On Prem, in the cloud and hybrid," (Sep. 27, 2018), https://www.computerweekly.com/news/252449283/Object-storage-On-prem-in-the-cloud-and-hybrid, pp. 1-8.

Sonobuoy Overview, https://sonobuoy.io/docs/v0.56.10/.

"Choosing a load balancer for your object storage environment", NetApp 2020.

"NetApp StorageGRID", NetApp 2022.

"Tutorial: Transferring data from on-premises storage to Amazon S3 in a different AWS account", https://docs.aws.amazon.com/datasync/latest/userguide/s3-cross-account-transfer.html, accessed Dec. 12, 2022.

"What is AWS Data Sync?", https://docs.aws.amazon.com/datasync/latest/userguide/what-is-datasync.html, accessed Dec. 12, 2022.

Amazon, "Copy your data between on premises object storage and AWS using AWS DataSync", Jul. 27, 2020, https://aws.amazon.com/about-aws/whats-new/2020/07/copy-your-data-between-on-premises-object-storage-and-aws-using-aws-datasync/.

Cloudian, "HyperBalance Load Balancer", https://cloudian.com/products/hyperbalance/, accessed Dec. 12, 2022.

Cloudian, "On-Premises Object Storage: Building S3 in Your Backyard", https://cloudian.com/guides/hybrid-it/on-premises-object-storage/, accessed Dec. 12, 2022.

Cloudian, "S3 Backup: The Complete Guide", https://cloudian.com/blog/s3-backup-the-complete-guide/, accessed Dec. 12, 2022.

Cloudian, "Simple, Secure, Scalable. S3-Compatible, Cloud Native Data Management", https://cloudian.com/products/hyperstore/, accessed Dec. 12, 2022.

NetApp, "StorageGRID: Smart, fast, future-proof object storage", https://www.netapp.com/data-storage/storagegrid/, accessed Dec. 12, 2022.

* cited by examiner

SYSTEM AND METHOD FOR MULTI-CLUSTER STORAGE

CROSS-REFERENCE TO RELATED APPLICATION

This application is related to and claims priority under 35 U.S. § 119(e) from Indian Provisional Application No. 202041007064, filed Feb. 19, 2020, titled "SYSTEM AND METHOD FOR MULTI-CLUSTER STORAGE," the entire contents of which are incorporated herein by reference for all purposes.

BACKGROUND

Virtual computing systems are widely used in a variety of applications. Virtual computing systems include one or more host machines running one or more virtual machines concurrently. The virtual machines utilize the hardware resources of the underlying host machines. Each virtual machine may be configured to run an instance of an operating system. Modern virtual computing systems allow several operating systems and several software applications to be safely run at the same time on the virtual machines of a single host machine, thereby increasing resource utilization and performance efficiency. However, the present-day virtual computing systems have limitations due to their configuration and the way they operate.

SUMMARY

Aspects of the present disclosure relate generally to a virtualization environment, and more particularly to a system and method for multi-cluster storage expansion.

An illustrative embodiment disclosed herein is an apparatus including a processor having programmed instructions to maintain an object store including a primary cluster having one or more compute resources and one or more first storage resources, identify a secondary cluster having one or more second storage resources, select the secondary cluster to be added to the object store, allocate an available portion of the one or more second storage resources to the object store, and shard an object across the one or more second storage resources and the available portion of the one or more second storage resources.

Another illustrative embodiment disclosed herein is a non-transitory computer readable storage medium having instructions stored thereon that, upon execution by a processor, causes the processor to perform operations including maintaining an object store including a primary cluster having one or more compute resources and one or more first storage resources, identifying a secondary cluster having one or more second storage resources, selecting the secondary cluster to be added to the object store, allocating an available portion of the one or more second storage resources to the object store, and sharding an object across the one or more second storage resources and the available portion of the one or more second storage resources.

Another illustrative embodiment disclosed herein is a computer-implemented method including, by a processor, maintaining an object store including a primary cluster having one or more compute resources and one or more first storage resources, identifying, by the processor, a secondary cluster having one or more second storage resources, selecting, by the processor, the secondary cluster to be added to the object store, allocating, by the processor, an available portion of the one or more second storage resources to the object store, and sharding, by the processor, an object across the one or more second storage resources and the available portion of the one or more second storage resources.

Further details of aspects, objects, and advantages of the invention are described below in the detailed description, drawings, and claims. Both the foregoing general description and the following detailed description are exemplary and explanatory, and are not intended to be limiting as to the scope of the invention. Particular embodiments may include all, some, or none of the components, elements, features, functions, operations, or steps of the embodiments disclosed above. The subject matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Data storage needs of business are growing, and thus, are becoming increasingly complex and expensive. In order to meet the demand for storage capacity, enterprise Information Technology (IT) teams are looking for ways to deliver on-premises IT services with the speed and operational efficiency of public cloud services. Traditional solutions like increasing the number of disks, nodes, or racks on-premises is limited by space, cost, and power consumption. Another avenue is to increase the number of application (e.g., object-store, database, file system, etc.) instances to store the enterprise's data, but this increases complexity due to having to manage multiple namespaces.

Some embodiments of the present disclosure describes a multi-cluster storage expansion to satisfy growing storage needs. A cluster is a convergence of compute, storage, and networking resources across multiple nodes. When the storage capacity of the underlying cluster runs out, the capacity can be increased by consuming free capacity available in other clusters. In some embodiments, the multi-cluster system monitors usage of each of the clusters, alerts the user if a cluster exceeds a threshold portion of capacity, migrates data between clusters, and removes the additional clusters.

Enabling multiple clusters provides valuable benefits. These include, by way of example, scaling storage capacity by federating clusters without greatly increasing complexity of the platform like in traditional solutions. Moreover, having clusters in multiple regions minimizes latency by serving users from the cluster that is closest to them. Thus, users can run workloads where the services are. Further, by spreading load across different availability zones, federation minimizes the impact of cluster failure. Also, for fault isolation, it might be better to have multiple small clusters rather than a single large cluster. Moreover, by making it easier to migrate applications across clusters, federation prevents cluster provider lock-in. Further, resources can be synchronized across clusters. For example, a user ensure that the same deployment exists in multiple clusters.

Object Virtualization Technology and Environment

Figure 1:
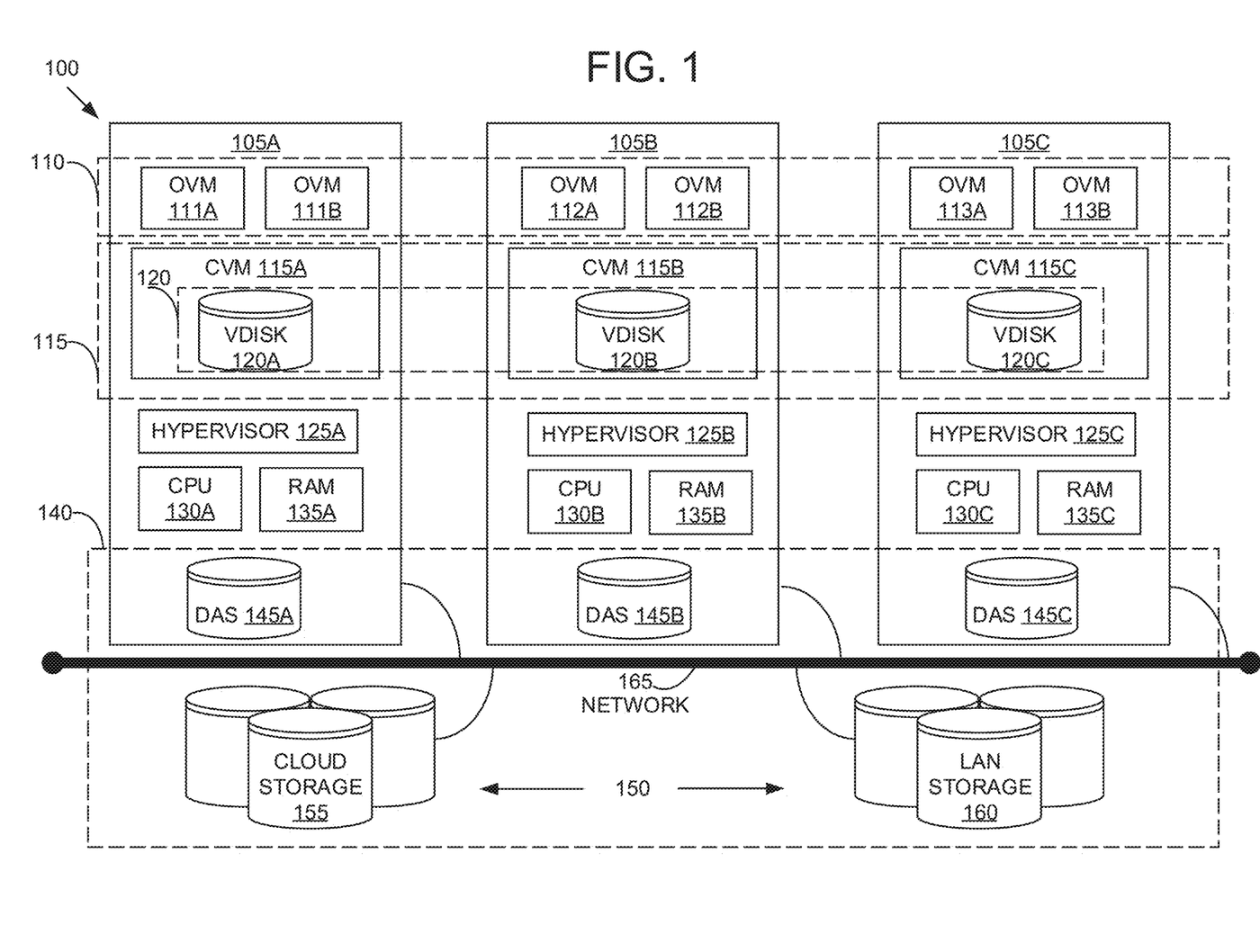
FIG. 1 is an example block diagram of a virtual computing system, in accordance with some embodiments of the present disclosure.

Referring now to FIG. 1, a virtual computing system 100 is shown, in accordance with some embodiments of the present disclosure. The virtual computing system 100 includes a plurality of nodes, such as a first node 105A, a second node 105B, and a third node 105C. The nodes may be collectively referred to herein as "nodes 105." Each of the nodes 105 may also be referred to as a "host" or "host machine." The first node 105A includes an object virtual machine ("OVMs") 111A and 111B (collectively referred to herein as "OVMs 111"), a controller virtual machine ("CVM") 115A, and a hypervisor 125A. Similarly, the second node 105B includes OVMs 112A and 112B (collectively referred to herein as "OVMs 112"), a CVM 115B, and a hypervisor 125B, and the third node 105C includes OVMs 113A and 113B (collectively referred to herein as "OVMs 113"), a CVM 115C, and a hypervisor 125C. The OVMs 111, 112, and 113 may be collectively referred to herein as "OVMs 110." The CVMs 115A, 115B, and 115C may be collectively referred to herein as "CVMs 115." The nodes 105 are connected to a network 165.

The virtual computing system 100 also includes a storage pool 140. The storage pool 140 may include network-attached storage (NAS) 150 and direct-attached storage (DAS) 145A, 145B, and 145C (collectively referred to herein as DAS 145). The NAS 150 is accessible via the network 165 and, in some embodiments, may include cloud storage 155, as well as local area network ("LAN") storage 160. In contrast to the NAS 150, which is accessible via the network 165, each of the DAS 145A, the DAS 145B, and the DAS 145C includes storage components that are provided internally within the first node 105A, the second node 105B, and the third node 105C, respectively, such that each of the first, second, and third nodes may access its respective DAS without having to access the network 165.

The CVM 115A may include one or more virtual disks ("vdisks") 120A, the CVM 115B may include one or more vdisks 120B, and the CVM 115C may include one or more vdisks 120C. The vdisks 120A, the vdisks 120B, and the vdisks 120C are collectively referred to herein as "vdisks 120." The vdisks 120 may be a logical representation of storage space allocated from the storage pool 140. Each of the vdisks 120 may be located in a memory of a respective one of the CVMs 115. The memory of each of the CVMs 115 may be a virtualized instance of underlying hardware, such as the RAMs 135 and/or the storage pool 140. The virtualization of the underlying hardware is described below.

In some embodiments, the CVMs 115 may be configured to run a distributed operating system in that each of the CVMs 115 run a subset of the distributed operating system. In some embodiments, an operating system such as the Nutanix Operating System ("NOS"), the CVMs 115, a hypervisor, and the underlying storage of the nodes (e.g., nodes 105) on which the CVMs 115 are running, form one or more storage clusters (e.g., "NOS clusters"). In some embodiments, the one or more NOS clusters include greater than or fewer than the CVMs 115. In some embodiments, each of the CVMs 115 run a separate, independent instance of an operating system. In some embodiments, the one or more NOS clusters may be referred to as a storage layer.

In some embodiments, the OVMs 110 form an OVM cluster. OVMs of an OVM cluster may be configured to share resources with each other. The OVMs in the OVM cluster may be configured to access storage from the NOS cluster using one or more of the vdisks 120 as a storage unit. The OVMs in the OVM cluster may be configured to run software-defined object storage service, such as Nutanix Objects™ or Nutanix Buckets™. The OVM cluster may be configured to create buckets, add objects to the buckets, and manage the buckets and objects. In some embodiments, the OVM cluster include greater than or fewer than the OVMs 110.

Multiple OVM clusters and/or multiple NOS clusters may exist within a given virtual computing system (e.g., the virtual computing system 100). In some embodiments, the virtual computing system 100 is a hyperconverged infrastructure (HCI) of one or more OVM clusters and one or more NOS clusters. The one or more OVM clusters may be referred to as a client layer or object layer. The OVM clusters may be configured to access storage from multiple NOS clusters. Each of the OVM clusters may be configured to access storage from a same NOS cluster. A central management system, such as Prism Central, may manage a configuration of the multiple OVM clusters and/or multiple NOS clusters. The configuration may include a list of OVM clusters, a mapping of each OVM cluster to a list of NOS clusters from which the OVM cluster may access storage, and/or a mapping of each OVM cluster to a list of vdisks that the OVM cluster owns or has access to.

Each of the OVMs 110 and the CVMs 115 is a software-based implementation of a computing machine in the virtual computing system 100. The OVMs 110 and the CVMs 115 emulate the functionality of a physical computer. Specifically, the hardware resources, such as CPU, memory, storage, etc., of a single physical server computer (e.g., the first node 105A, the second node 105B, or the third node 105C) are virtualized or transformed by the respective hypervisor (e.g. the hypervisor 125A, the hypervisor 125B, and the hypervisor 125C), into the underlying support for each of the OVMs 110 and the CVMs 115 that may run its own operating system, a distributed operating system, and/or applications on the underlying physical resources just like a real computer. By encapsulating an entire machine, including CPU, memory, operating system, storage devices, and network devices, the OVMs 110 and the CVMs 115 are compatible with most standard operating systems (e.g. Windows, Linux, etc.), applications, and device drivers. Thus, each of the hypervisors 125 is a virtual machine monitor that allows the single physical server computer to run multiple instances of the OVMs 110 (e.g. the OVM 111) and at least one instance of a CVM 115 (e.g. the CVM 115A), with each of the OVM instances and the CVM instance sharing the resources of that one physical server computer, potentially across multiple environments. By running the multiple instances of the OVMs 110 on a node of the nodes 105, multiple workloads and multiple operating systems may be run on the single piece of underlying hardware computer to increase resource utilization and manage workflow.

The hypervisors 125 of the respective nodes 105 may be configured to run virtualization software, such as, ESXi from VMWare, AHV from Nutanix, Inc., XenServer from Citrix Systems, Inc., etc. The virtualization software on the hypervisors 125 may be configured for managing the interactions between the respective OVMs 110 (and/or the CVMs 115) and the underlying hardware of the respective nodes 105. Each of the CVMs 115 and the hypervisors 125 may be configured as suitable for use within the virtual computing system 100.

In some embodiments, each of the nodes 105 may be a hardware device, such as a server. For example, in some embodiments, one or more of the nodes 105 may be an NX-1000 server, NX-3000 server, NX-5000 server, NX-6000 server, NX-8000 server, etc. provided by Nutanix, Inc. or server computers from Dell, Inc., Lenovo Group Ltd. or Lenovo PC International, Cisco Systems, Inc., etc. In other embodiments, one or more of the nodes 105 may be another type of hardware device, such as a personal computer, an input/output or peripheral unit such as a printer, or any type of device that is suitable for use as a node within the virtual computing system 100. In some embodiments, the virtual computing system 100 may be part of a data center.

The first node 105A may include one or more central processing units ("CPUs") 130A, the second node 105B may include one or more CPUs 130B, and the third node 105C may include one or more CPUs 130C. The CPUs 130A, 130B, and 130C are collectively referred to herein as the CPUs 130. The CPUs 130 may be configured to execute instructions. The instructions may be carried out by a special purpose computer, logic circuits, or hardware circuits of the first node 105A, the second node 105B, and the third node 105C. The CPUs 130 may be implemented in hardware, firmware, software, or any combination thereof. The term "execution" is, for example, the process of running an application or the carrying out of the operation called for by an instruction. The instructions may be written using one or more programming language, scripting language, assembly language, etc. The CPUs 130, thus, execute an instruction, meaning that they perform the operations called for by that instruction.

The first node 105A may include one or more random access memory units ("RAM") 135A, the second node 105B may include one or more RAM 135B, and the third node 105C may include one or more RAM 135C. The RAMs 135A, 135B, and 135C are collectively referred to herein as the RAMs 135. The CPUs 130 may be operably coupled to the respective one of the RAMs 135, the storage pool 140, as well as with other elements of the respective ones of the nodes 105 to receive, send, and process information, and to control the operations of the respective underlying node. Each of the CPUs 130 may retrieve a set of instructions from the storage pool 140, such as, from a permanent memory device like a read only memory ("ROM") device and copy the instructions in an executable form to a temporary memory device that is generally some form of random access memory ("RAM"), such as a respective one of the RAMs 135. One of or both of the ROM and RAM be part of the storage pool 140, or in some embodiments, may be separately provisioned from the storage pool. The RAM may be stand-alone hardware such as RAM chips or modules. Further, each of the CPUs 130 may include a single standalone CPU, or a plurality of CPUs that use the same or different processing technology.

Each of the DAS 145 may include a variety of types of memory devices. For example, in some embodiments, one or more of the DAS 145 may include, but is not limited to, any type of RAM, ROM, flash memory, magnetic storage devices (e.g., hard disk, floppy disk, magnetic strips, etc.), optical disks (e.g., compact disk ("CD"), digital versatile disk ("DVD"), etc.), smart cards, solid state devices, etc. Likewise, the NAS 150 may include any of a variety of network accessible storage (e.g., the cloud storage 155, the LAN storage 160, etc.) that is suitable for use within the virtual computing system 100 and accessible via the network 165. The storage pool 140, including the NAS 150 and the DAS 145, together form a distributed storage system configured to be accessed by each of the nodes 105 via the network 165, one or more of the OVMs 110, one or more of the CVMs 115, and/or one or more of the hypervisors 125.

Each of the nodes 105 may be configured to communicate and share resources with each other via the network 165, including the respective one of the CPUs 130, the respective one of the RAMs 135, and the respective one of the DAS 145. For example, in some embodiments, the nodes 105 may communicate and share resources with each other via one or more of the OVMs 110, one or more of the CVMs 115, and/or one or more of the hypervisors 125. One or more of the nodes 105 may be organized in a variety of network topologies.

The network 165 may include any of a variety of wired or wireless network channels that may be suitable for use within the virtual computing system 100. For example, in some embodiments, the network 165 may include wired connections, such as an Ethernet connection, one or more twisted pair wires, coaxial cables, fiber optic cables, etc. In other embodiments, the network 165 may include wireless connections, such as microwaves, infrared waves, radio waves, spread spectrum technologies, satellites, etc. The network 165 may also be configured to communicate with another device using cellular networks, local area networks, wide area networks, the Internet, etc. In some embodiments, the network 165 may include a combination of wired and wireless communications.

Although three of the plurality of nodes (e.g., the first node 105A, the second node 105B, and the third node 105C) are shown in the virtual computing system 100, in other embodiments, greater than or fewer than three nodes may be used. Likewise, although only two of the OVMs are shown on each of the first node 105A (e.g. the OVMs 111), the second node 105B, and the third node 105C, in other embodiments, greater than or fewer than two OVMs may reside on some or all of the nodes 105.

It is to be understood again that only certain components and features of the virtual computing system 100 are shown and described herein. Nevertheless, other components and features that may be needed or desired to perform the functions described herein are contemplated and considered within the scope of the present disclosure. It is also to be understood that the configuration of the various components of the virtual computing system 100 described above is only an example and is not intended to be limiting in any way. Rather, the configuration of those components may vary to perform the functions described herein.

Multi-Cluster Storage

Objects are collections of unstructured data that includes object data and object metadata of the object or the object data. A bucket is a logical construct with a flat hierarchy that provides object access to users. A deployment can have multiple buckets. Each object may be stored as opaque data (e.g., no regard to format of the data). Each object may be sharded/striped/chunkified. Each object or object shard may be assigned to one bucket. Each bucket may have a (e.g., globally) unique name. Each object in a bucket may have a name that is unique to the bucket. Thus, each object may have a unique name when addressed together with the parent bucket of the bucket.

Object storage service (OSS), is a layered service being built over NOS. OSS uses the power of the NOS offering and builds an efficient and scalable object store service on top. External users (e.g., clients, client devices or client applications) may access OSS through an application programming interface (API). The API may be a REST (Representational State Transfer) HTTP interface. The OSS may be hosted on or represented by an API endpoint (e.g., an HTTP endpoint, server uniform resource locator (URL), etc.). Users read, write, or delete objects to the OSS using, for example, GET, PUT, POST, and DELETE commands (e.g., calls, requests, actions, etc.). In some embodiments, an entire object is written and partial writes, appends or overwrites are not permitted. For reads and writes, data flows through OSS components before being stored in NOS storage. The OSS may run on one or more OVMs. The OSS is herein referred to as the object layer.

Each bucket is backed by one or more vdisks (e.g., the vdisks 120 in FIG. 1), which are backed by an underlying storage (e.g., the storage pool 140 or a component thereof, such as a NOS container, a SAN, or a NAS). In some embodiments, a vdisk appears to the bucket, a CVM, or other VM, as a SAN or NAS storage. The bucket or CVM reads or writes to the vdisk using, for example, SCSI or NFS protocol. In some embodiments, the vdisk encapsulates the SCSI commands in iSCSI and sends the iSCSI commands across the network to the SAN hardware that is backing the vdisk. In some embodiments, the vdisk encapsulates and/or forwards the NFS commands across the network to the NAS storage that is backing the vdisk.

Regions from vdisks are allocated to buckets. A region provides the high-level mapping between at least one of an object or a bucket and the corresponding locations on a vdisk (e.g., a vDisk ID, vdisk offset, and vdisk length). Vdisks may be subdivided (e.g. chunked) into multiple fixed-size regions. A region can include portions (e.g., portions, chunks, blocks, locations) of multiple vdisks.

Figure 2:
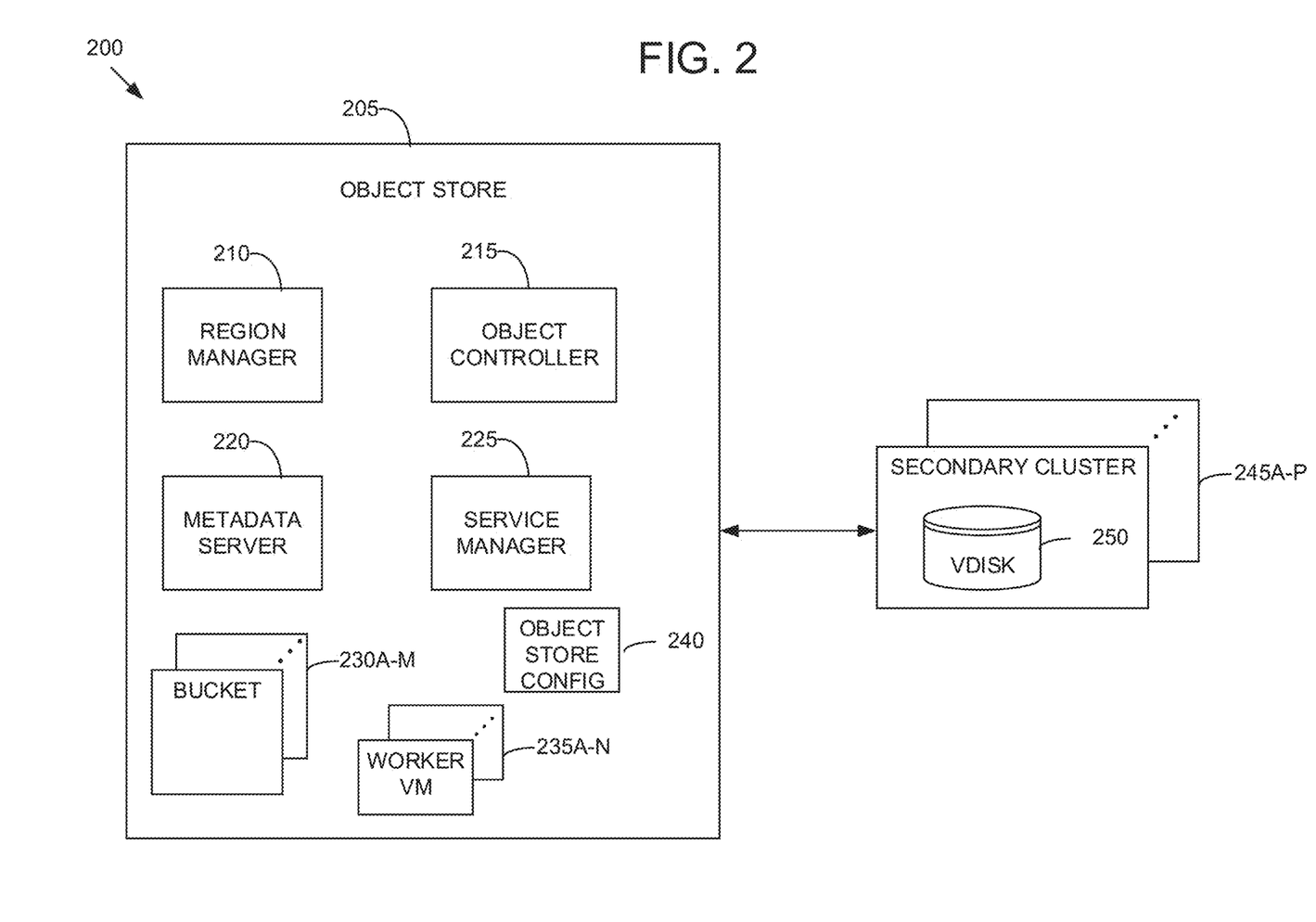
FIG. 2 is an example block diagram of a multi-cluster storage system, in accordance with some embodiments of the present disclosure.

FIG. 2 illustrates a multi-cluster storage system 200. The multi-cluster storage system 200 includes an object store (e.g., object store service) 205. The object store 205 includes a region manager (RM) 210, an object controller (OC) 215, a metadata server (MS) 220, a service manager 225, multiple buckets 230A-M, multiple worker VMs 235A-N, and an object store configuration (config) 240. The object store 205 is hosted on one or more nodes of a primary cluster. In some embodiments, the primary cluster is a hyperconverged infrastructure (HCI) cluster of a compute cluster and a storage cluster. In some embodiments, compute cluster is the OVM cluster running associated with FIG. 1 and the storage cluster is the NOS cluster associated with FIG. 1.

In some embodiments, The object store 205 is in communication with multiple secondary clusters 245A-P. Each of the secondary clusters have one or more nodes, one or more vdisks 250, and underlying storage. The object store 205 (e.g., a federation) includes the primary cluster and any secondary clusters 245A-P that have been added to the object store 205. After a secondary cluster (e.g., 245A) is added, the components can perform object storage operations (e.g., store, read, write, delete) with respect to the secondary cluster 245A as if the secondary cluster was the primary cluster that had its storage capacity increased. In some embodiments, at least one of the one or more secondary clusters 245A-P is a hyperconverged infrastructure (HCI) cluster. In some embodiments, at least one of the one or more secondary clusters 245A-P is a storage cluster (e.g., without a compute cluster). In some embodiments, at least one of the one or more secondary clusters 245A-P is cloud-based storage.

In some embodiments, the primary cluster and the one or more secondary clusters are part of a storage federated namespace. That is, each of the cluster names are unique. In some embodiments, the object store 205 is hypervisor agnostic, meaning that the object store 205 can access added secondary clusters 245A-P even if the nodes of the one or more of the secondary clusters 245A-P have different hypervisors than the nodes on the primary cluster. For example, the primary cluster may include a first hypervisor-type (e.g., a hypervisor of a first vendor) and the secondary cluster may include a second hypervisor-type (e.g., a hypervisor of a second vendor) different from the first hypervisor-type.

The region manager 210 includes a processor with programmed instructions (herein, the region manager 210 includes programmed instructions) to manage all of the object storage information on the vdisks backed by underlying storage (for both the primary cluster and the subset of secondary clusters 245A-P that have been added to the object store 205).

The region manager 210 includes programmed instructions to discover (e.g., discover, detect, identify, determine, track) existing secondary clusters 245A-P. The region manager 210 includes programmed instructions to create vdisks 250 on the existing secondary clusters 245A-P. The region manager 210 includes programmed instructions to populate the config 240 with secondary cluster details, including creating a unique store identifier (e.g., ID) for each of the secondary clusters 245A-P. The config 240 includes a unique data store identifier (e.g., ID) for each of the secondary clusters 245A-P. The data store ID can be used to lookup the secondary cluster details in the config 240, such as cluster uuid and container name/uuid. The config 240 can contain information about the newly added subset of the secondary clusters 245A-P in terms of storage capacity, free space, our soft limit of space usage on the cluster, the number and types of nodes and disks.

The region manager 210 includes programmed instructions to create new vdisks 250. Vdisks 250 previously created without the data store ID field set will be considered to be belonging to primary cluster. A new one of the vdisks 250 created after a data store ID is created for the secondary cluster (e.g., 245A) on which the new one of the vdisks 250 is running belongs to that secondary cluster.

The region manager 210 includes programmed instructions to distribute allocations of regions from vdisks 250 on different clusters 245A-P. In some embodiments, the region manager 210 includes programmed instructions to allocate space such that consumption is directly proportional to some characteristic (e.g., free disk space, latency, throughput, and the like) on the respective clusters 245A-P (e.g., weighted allocation). In order to do this, the region manager 210 can actively poll the characteristic. In some embodiments, the region manager 210 includes programmed instructions to equally allocate regions from vdisks 250 on all the clusters 245A-P (e.g., round robin allocation). In some embodiments, the region manager 210 includes programmed instructions to periodically update the allocation. The region manager 210 includes programmed instructions to allocate the regions to the buckets 230A-M. In some embodiments, the allocation of regions to buckets can be a weighted allocation or a round robin allocation. In some embodiments, first regions from vdisks 250 (e.g., previously free space) are allocated to the buckets 230A-M, and second regions from vdisks 250 are allocated to other buckets on other clusters (e.g., secondary clusters 245A-P or other clusters). In some embodiments, first regions from vdisks 250 are assigned to a first tenant and second regions from vdisks 250 are assigned to as second tenant.

In some embodiments, the region manager 210 includes programmed instructions to close any of the vdisks 250 on nodes running out of storage capacity. As soon as one of the clusters 245A-P (e.g., cluster 245A) is marked to be removed from the object store 205, the region manager 210 includes programmed instructions to stop allocating new regions and creating new ones of the vdisks 250 on that cluster 245A. In some embodiments, the region manager 210 includes programmed instructions to close open regions allocated from any of the vdisks 250 belonging to the cluster 245A marked to be removed. The region manager 210 includes programmed instructions to partition the virtual disks 250 into regions.

The object controller 215 includes a processor with programmed instructions (herein, the object controller 215 includes programmed instructions) to manage object data and coordinate metadata updates with the metadata server 220. The object controller 215 includes programmed instructions to store objects (e.g., or object portions/shards/stripes/chunks) in one or more of the buckets 230A-M (e.g., bucket 230A), for example, in accordance to the allocation determined by the region manager 210. In some embodiments, the object controller 215 includes programmed instructions to store a first object or portion of an object in a first bucket mapped to a vdisk (e.g., of the vdisks 250) belonging to a secondary cluster 245A and a second object or portion of an object in a second bucket mapped to a vdisk (e.g., of the vdisks 250) belonging to the primary cluster or a secondary cluster 245B. In some embodiments, the object controller 215 includes programmed instructions to store unique objects or portions of objects in each of one or more clusters (e.g., the objects or portions are not replicas). In some embodiments, the object controller 215 includes programmed instructions to identify the one or more regions of the one or more of the vdisks 250 that are mapped to the bucket 230A. For example, the object controller 215 can access the config 240 to determine this. In some embodiments, the object controller 215 includes processor to store objects in regions of one or more of the vdisks 250 that are mapped to the bucket 230A. In other embodiments, the bucket 230A stores the objects in regions of one or more of the vdisks 250 that are mapped to the bucket 230A. In some embodiments, the object controller 215 has programmed instructions to access (store, read, write, delete) objects in regions of one or more of the vdisks 250 that are mapped to the bucket 230A through an application programming interface (API) such as a Representational State Transfer (REST) API or a remote procedure call (RPC) API.

The object controller 215 includes programmed instructions to migrate data belonging to vdisks 250 on any of the clusters 245A-P that are to be removed from the object store 205. In some embodiments, the object controller 215 includes programmed instructions to do a pre-check for sufficient space available to migrate data from the cluster to be decommissioned (e.g., 245A) and distribute across other secondary clusters 245B-P. In some embodiments, the object controller 215 includes programmed instructions to identify regions belonging to vdisks on a cluster to be decommissioned. The object controller 215 can issue background migration tasks. In some embodiments, the object controller 215 includes programmed instructions to leverage worker VMs 235A-N (or an application/container/component associated the worker VMs 235A-N) to do map reduce processing of metadata to identify regions belonging to vdisks on a cluster to be decommissioned 245A. In some embodiments, the object controller 215 includes programmed instructions to either generate an in-memory map to figure out what vdisks belong to the to-be-removed cluster 245A or perform a reduce on the vdisk ID to figure out the region-IDs to be migrated and trigger tasks. Either of these can happen as part of a partial scan (see below). In some embodiments, the object controller 215 can leverage the existing background task to migrate data at region level as part of OC background task. In some embodiments, the object controller 215 can use a Multi-part data migrate API to migrate data parts in parallel.

In some embodiments, the object controller 215 (or some other object store component) includes programmed instructions to perform full scans (FS) or partial scans (PS) of metadata periodically to identify regions belonging to vdisks 250 on a cluster to be decommissioned (e.g., 245A). Partial scans can run periodically (e.g., every 1 hour) and generate all the migrate tasks at one time. Partial scans may not have the live offsets of the regions and the OC 215 may issue migrate on an entire region, containing zeros or non-referenced objects as well. A full scan runs performs partition based scans and can only generate scans for regions in the partition. In some embodiments, two full scans can cover entire metadata range. In some embodiments, the full scan can skip over zeroes and garbage while issuing migrate with exact ranges to copy. In some embodiments, the object controller 215 continues to schedule scans (PS or FS) until the tasks are generated.

In some embodiments, the object store 205 includes multiple object controller 215 instances, each of which includes programmed instructions to perform the foregoing tasks by the object controller 215. In some embodiments, a number of open vdisks 250 can be determined by, or proportional to, a number of the object controller 215 instances.

The service manager 225 includes a processor with programmed instructions (herein, the service manager 225 includes programmed instructions) to serve as the endpoint for all user interface (UI) requests (e.g., from users) and manage object store instances. The service manager 225 includes programmed instructions to provide a UI to the user for adding one of the secondary clusters 245A-P to a deployed object store instance, viewing stats from the different clusters and highlight the primary cluster, and remove one of the secondary clusters 245A-P. In some embodiments, the service manager 225 includes programmed instructions to update the config 240 via the UI gateway as part of add/remove/update cluster workflows triggered from user actions in the UI. All the changes made via the UI can be stored/updated in the object store instance via the UI Gateway.

The service manager 225 includes programmed instructions to collection stats from instances. The service manager 225 includes programmed instructions to display usage and stats from the primary cluster and all the secondary clusters 245A-P in addition to the total usage. Some of the usage metrics to periodically collect from every one of the secondary clusters 245A-P are (a) used space on the object store or bucket container, (b) free space on the cluster, (c) space used by other containers. These stats need to be published to database component (e.g., key-value store) in object store periodically and integrated with the UI Gateway workflow for publishing to the UI. There are two approaches to access this information from Buckets. One way is to use an API to get container information from the primary cluster and all the secondary clusters 245A-P. This makes a REST call to the Virtual IP of the clusters and queries components from the underlying cluster. Another approach would be to add an API in the vdisk proxy that would send an RPC from the vdisk proxy to other components of the cluster to get the requested information.

The service manager 225 includes programmed instructions to generate alerts (e.g., regarding low free space on the primary cluster or any of the secondary clusters 245A-P). In some embodiments, the service manager 225 includes programmed instructions to determine a soft limit per cluster (e.g., on the primary cluster or any of the secondary clusters 245A-P). This could either be assigned internally or requested as optional input from the user as part of the add cluster. An alert can be generated once space consumption crosses the soft limit (e.g., limit threshold, etc.) quota on the primary cluster or any of the secondary clusters 245A-P. In some embodiments, the object store 205 can however continue using space after alerting the user.

In some embodiments, the added secondary cluster (e.g., 245A) might not be dedicated for the object store 205. It might be running some other VMs or services, and, hence, the object store 205 shares the capacity with other consumers. In some embodiments, the service manager 225 includes programmed instructions to monitor (e.g., monitor, watch, track, identify, determine, detect) the free space left on the secondary cluster e.g., 245A even if the object store 205 is within the soft limit. In some embodiments, a second limit may be set based on the free space left on the secondary cluster e.g., 245A.

In some embodiments, the service manager 225 includes programmed instructions to generate an alert if a data migration is taking longer than a threshold time. The data migration may be associated with decommissioning one of the secondary clusters (e.g., 245A). In some embodiments, the service manager 225 alerts the user if the secondary clusters 245A removal from the object store 205 is taking longer than expected for if it seems in a stuck state. The service manager 225 can set an upper limit for data migration operation out of the secondary clusters 245A.

In some embodiments, the service manager 225 includes programmed instructions to generate an alert if one of the secondary clusters (e.g., 245A) is unreachable for longer than a threshold time. In some embodiments, the worker VMs 235A-N periodically check that each of the secondary clusters 245A-P that have been added to the object store 205 are reachable. For example, for any spike in the network latency over a period of where latency observed is above a threshold of for example 2 ms, the service manager 225 issues an alert.

In some embodiments, the service manager 225 includes programmed instructions to create NOS containers. In some embodiments, the service manager 225 (or some other component of the object store 205) includes programmed instructions to perform pre checks for adding one or more of the secondary clusters 245A-P like whitelisting the IP/port for the vdisk/vdisk proxy/secondary cluster and other settings like cluster DSIP and VIP for ensuring network reachability and connectivity. In some embodiments, the service manager 225 includes programmed instructions to create worker VMs on the primary cluster.

The metadata server 220 includes a processor with programmed instructions (herein, the metadata server 220 includes programmed instructions) to contain all the metadata around an object store deployment (e.g. buckets, objects, etc.). The metadata server 220 includes programmed instructions to leverage a key-value store for storage of the metadata. In some embodiments, the metadata server 220 includes programmed instructions to store the config 240 in the key-value store.

Figure 3:
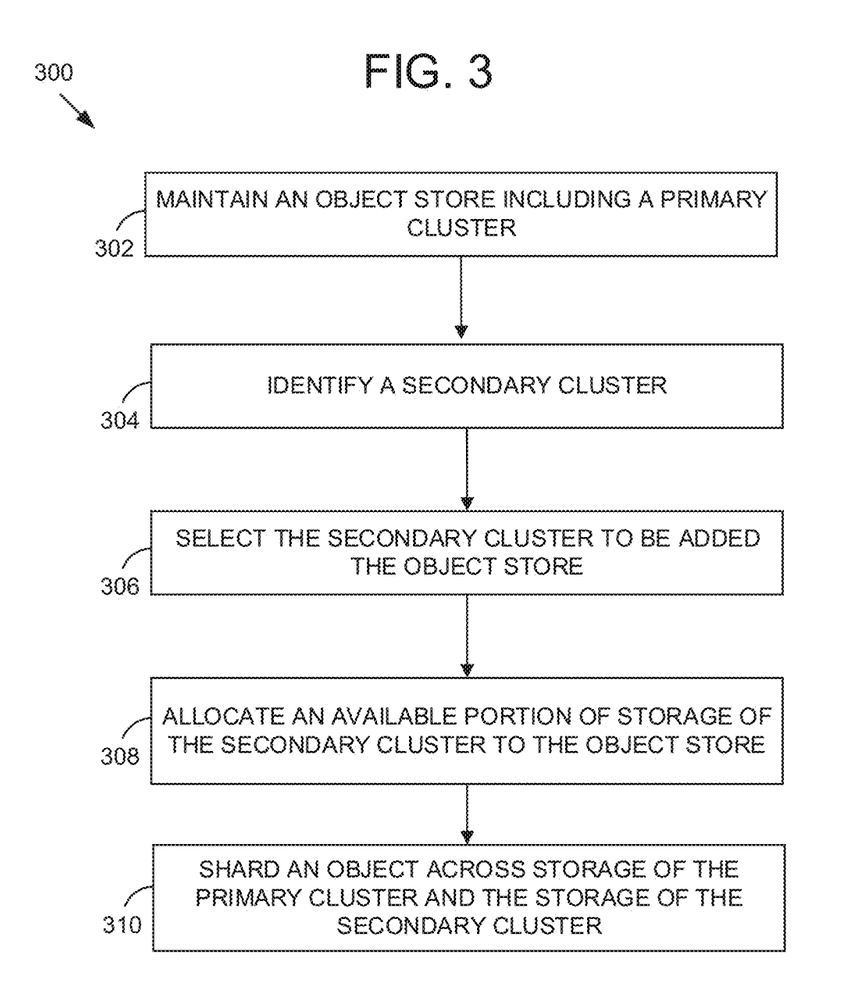
FIG. 3 is a flowchart of an example method 300 for multi-cluster storage, in accordance with some embodiments of the present disclosure.

Referring now to FIG. 3, a flowchart of an example method 300 for multi-cluster storage is illustrated. The method 300 may be implemented using, or performed by, an object store 205, one or more components/elements/entities of the object store 205, a processor associated with the object store 205, or one or more processors respectively associated one or more components/elements/entities of the object store 205, which is detailed herein with respect to the virtual computing system 100 and the multi-cluster storage system 200. Additional, fewer, or different operations may be performed in the method 300 depending on the embodiment.

The processor associated with the object store (e.g., the CPU 130A associated with the object store 205) maintain an object store including a primary cluster having one or more compute resources and one or more first storage resources (302). In some embodiments, the primary cluster is a hyperconverged infrastructure (HCI) cluster. In some embodiments, the primary cluster is running a first hypervisor-type.

The processor identifies a secondary cluster, such as the secondary cluster 245A, having one or more second storage resources (304). In some embodiments, the secondary cluster is a hyperconverged infrastructure (HCI) cluster. In some embodiments, the secondary cluster is running a second hypervisor-type different from the first hypervisor-type. In some embodiments, the primary cluster and the secondary cluster are part of a storage federated namespace. In some embodiments, wherein the one or more second storage resources are shared between multiple tenants. In some embodiments, the secondary cluster includes one or more secondary clusters. In some embodiments, the object store populates a configuration, such as config 240, with an identifier of the secondary cluster, such as a data store ID. In some embodiments, the processor identifies more than one secondary cluster.

The processor selects the secondary cluster to be added to the object store (306). After adding the secondary cluster to the object store, some or all of the components of the primary cluster (on which the processor is running) have access to the secondary cluster. The processor allocates an available portion (e.g., free space) of the one or more second storage resources to the object store (308). In some embodiments, the processor can use round robin allocation or weighted allocation to determine how much free space to allocate. The free space includes a region of one or more vdisks (e.g., a vdisk 250) running on the secondary cluster. The processor stores object data on the one or more second storage resources and the available portion of the one or more second storage resources (310). The processor can use round robin allocation or weighted allocation to determine a first portion of the data to store on the primary cluster and a second portion of the data to store on the secondary cluster. In some embodiments, the processor shards an object across the one or more second storage resources and the available portion of the one or more second storage resources.

Referring back to FIG. 2, in some embodiments, each of the nodes on each primary cluster includes all the components of the node 105 of FIG. 1. In some embodiments, each of the nodes on each secondary cluster are similar to node 105 of FIG. 1. In some embodiments, each of the vdisks 250 is similar to the vdisk 120A of FIG. 1. In some embodiments, each of the worker VMs 235A-N are similar to the OVM 111A of FIG. 1, the CVM 115A of FIG. 1, or a user VM. In some embodiments, each of the region manager 210, the object controller 215, a metadata server 220, a service manager 225 are running on VMs similar to the OVM 111A of FIG. 1, the CVM 115A of FIG. 1, or a user VM. In some embodiments, each of the multiple buckets 230A-M are implemented as at least one of containers, files, or VMs.

Each of the elements or entities of the virtual computing system 100 and the multi-cluster storage system 200 (e.g., the object store 205, the region manager 210, the object controller 215, the metadata server 220, the service manager 225, the buckets 230A-M, the worker VMs 235A-N, the secondary clusters 245A-P, and the vdisks 250), is implemented using hardware, software, or a combination of hardware or software, in one or more embodiments. The elements or entities of the virtual computing system 100 and the multi-cluster storage system 200 can include any application, program, library, script, task, service, process or any type and form of executable instructions executed by one or more processors (e.g., the CPU 130A), in one or more embodiments. Each of the one or more processors is hardware. The instructions may be stored on one or more computer readable and/or executable storage media including non-transitory storage media such as non-transitory storage media in the storage pool 140 with respect to FIG. 1.

It is to be understood that any examples used herein are simply for purposes of explanation and are not intended to be limiting in any way.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed:

1. An apparatus comprising a processor having programmed instructions to:
   maintain an object store in a primary hyperconverged infrastructure (HCI) cluster having one or more compute resources and one or more first storage resources;
   identify a secondary HCI cluster in a remote multi-tenant cloud, the secondary HCI cluster having one or more sharable second storage resources;
   select the secondary HCI cluster to be added to the object store;
   allocate an available portion of the one or more sharable second storage resources to the object store;
   shard an object across the one or more first storage resources and the available portion of the one or more sharable second storage resources;
   determine that the primary HCI cluster and the secondary HCI cluster are part of a storage federated namespace; and
   identify the secondary HCI cluster responsive to usage of the one or more first storage resources exceeding a threshold portion of capacity.

2. The apparatus of claim 1, the processor having further programmed instructions to communicate with the secondary HCI cluster running a first hypervisor-type different from a second hypervisor-type of the primary HCI cluster.

3. The apparatus of claim 1, the processor having further programmed instructions to share the one or more sharable second storage resources between multiple tenants.

4. The apparatus of claim 1, the processor having further programmed instructions to determine that the secondary HCI cluster includes an HCI cluster and a non-HCI cluster.

5. The apparatus of claim 1, the processor having further programmed instructions to:
   collect usage metrics from the primary HCI cluster and the secondary HCI cluster; and
   display the usage metrics.

6. A non-transitory computer readable storage medium having instructions stored thereon that, upon execution by a processor, cause the processor to:
   maintain an object store in a primary hyperconverged infrastructure (HCI) cluster having one or more compute resources and one or more first storage resources;
   identify a secondary HCI cluster in a remote multi-tenant cloud, the secondary HCI cluster having one or more sharable second storage resources;
   select the secondary HCI cluster to be added to the object store;
   allocate an available portion of the one or more sharable second storage resources to the object store;
   shard an object across the one or more first storage resources and the available portion of the one or more sharable second storage resources;
   determine that the primary HCI cluster and the secondary HCI cluster are part of a storage federated namespace; and
   identify the secondary HCI cluster responsive to usage of the one or more first storage resources exceeding a threshold portion of capacity.

7. The medium of claim 6, the instructions stored thereon that, upon execution by the processor, further cause the processor to communicate with the secondary HCI cluster running a first hypervisor-type different from a second hypervisor-type of the primary HCI cluster.

8. The medium of claim 6, the instructions stored thereon that, upon execution by the processor, further cause the processor to share the one or more sharable second storage resources between multiple tenants.

9. The medium of claim 6, the instructions stored thereon that, upon execution by the processor, further cause the processor to determine that the secondary HCI cluster includes an HCI cluster and a non-HCI cluster.

10. The medium of claim 6, the instructions stored thereon that, upon execution by the processor, further cause the processor to:
    collect usage metrics from the primary HCI cluster and the secondary HCI cluster; and
    display the usage metrics.

11. A computer-implemented method comprising:
    maintaining, by a processor, an object store in a primary hyperconverged infrastructure (HCI) cluster having one or more compute resources and one or more first storage resources;
    identifying, by the processor, a secondary HCI cluster in a remote multi-tenant cloud, the secondary HCI cluster having one or more sharable second storage resources;
    selecting, by the processor, the secondary HCI cluster to be added to the object store;
    allocating, by the processor, an available portion of the one or more sharable second storage resources to the object store, wherein the primary HCI cluster and the secondary HCI cluster are part of a storage federated namespace; and
    sharding, by the processor, an object across the one or more first storage resources and the available portion of the one or more sharable second storage resources
    identifying the secondary HCI cluster responsive to usage of the one or more first storage resources exceeding a threshold portion of capacity.

12. The method of claim 11, wherein the primary HCI cluster is running a first hypervisor-type and the secondary HCI cluster is running a second hypervisor-type different from the first hypervisor-type.

13. The method of claim 11, wherein the one or more sharable second storage resources are shared between multiple tenants.

14. The method of claim 11, wherein the secondary HCI cluster includes an HCI cluster and a non-HCI cluster.

15. The method of claim 11, further comprising:
    collecting usage metrics from the primary HCI cluster and the secondary HCI cluster; and
    displaying the usage metrics.

16. An apparatus comprising a processor having programmed instructions to:
    maintain an object store in a primary hyperconverged infrastructure (HCI) cluster having one or more compute resources and one or more first storage resources;
    identify a secondary HCI cluster in a remote multi-tenant cloud, the secondary HCI cluster having one or more sharable second storage resources;
    select the secondary HCI cluster to be added to the object store;
    allocate an available portion of the one or more sharable second storage resources to the object store;
    shard an object across the one or more first storage resources and the available portion of the one or more sharable second storage resources;
    determine that the primary HCI cluster and the secondary HCI cluster are part of a storage federated namespace;
    collect usage metrics from the primary HCI cluster and the secondary HCI cluster; and
    display the usage metrics.

17. The apparatus of claim 16, the processor having further programmed instructions to communicate with the secondary HCI cluster running a first hypervisor-type different from a second hypervisor-type of the primary HCI cluster.

18. The apparatus of claim 16, the processor having further programmed instructions to share the one or more sharable second storage resources between multiple tenants.

19. The apparatus of claim 16, the processor having further programmed instructions to determine that the secondary HCI cluster includes an HCI cluster and a non-HCI cluster.

20. A non-transitory computer readable storage medium having instructions stored thereon that, upon execution by a processor, cause the processor to:
   maintain an object store in a primary hyperconverged infrastructure (HCI) cluster having one or more compute resources and one or more first storage resources;
   identify a secondary HCI cluster in a remote multi-tenant cloud, the secondary HCI cluster having one or more sharable second storage resources;
   select the secondary HCI cluster to be added to the object store;
   allocate an available portion of the one or more sharable second storage resources to the object store;
   shard an object across the one or more first storage resources and the available portion of the one or more sharable second storage resources;
   determine that the primary HCI cluster and the secondary HCI cluster are part of a storage federated namespace;
   collect usage metrics from the primary HCI cluster and the secondary HCI cluster; and
   display the usage metrics.

21. The medium of claim 20, the instructions stored thereon that, upon execution by the processor, further cause the processor to communicate with the secondary HCI cluster running a first hypervisor-type different from a second hypervisor-type of the primary HCI cluster.

22. The medium of claim 20, the instructions stored thereon that, upon execution by the processor, further cause the processor to share the one or more sharable second storage resources between multiple tenants.

23. The medium of claim 20, the instructions stored thereon that, upon execution by the processor, further cause the processor to determine that the secondary HCI cluster includes an HCI cluster and a non-HCI cluster.

24. A computer-implemented method comprising:
   maintaining, by a processor, an object store in a primary hyperconverged infrastructure (HCI) cluster having one or more compute resources and one or more first storage resources;
   identifying, by the processor, a secondary HCI cluster in a remote multi-tenant cloud, the secondary HCI cluster having one or more sharable second storage resources;
   selecting, by the processor, the secondary HCI cluster to be added to the object store;
   allocating, by the processor, an available portion of the one or more sharable second storage resources to the object store, wherein the primary HCI cluster and the secondary HCI cluster are part of a storage federated namespace;
   sharding, by the processor, an object across the one or more first storage resources and the available portion of the one or more sharable second storage resources
   identifying the secondary HCI cluster responsive to usage of the one or more first storage resources exceeding a threshold portion of capacity;
   collecting usage metrics from the primary HCI cluster and the secondary HCI cluster; and
   displaying the usage metrics.

25. The method of claim 24, wherein the primary HCI cluster is running a first hypervisor-type and the secondary HCI cluster is running a second hypervisor-type different from the first hypervisor-type.

26. The method of claim 24, wherein the one or more sharable second storage resources are shared between multiple tenants.

27. The method of claim 24, wherein the secondary HCI cluster includes an HCI cluster and a non-HCI cluster.

\* \* \* \* \*